(12) United States Patent
Kelada

(10) Patent No.: US 6,234,018 B1
(45) Date of Patent: May 22, 2001

(54) SAFETY LIQUID LEVEL SIGHT GAUGE

(76) Inventor: Maher I. Kelada, 1301 Edgewater, Friendswood, TX (US) 77546

( * ) Notice: Subject to any disclaimer, the term of this patent is extended or adjusted under 35 U.S.C. 154(b) by 0 days.

(21) Appl. No.: 09/413,310

(22) Filed: Oct. 6, 1999

(51) Int. Cl.$^7$ .................................................. G01F 23/02
(52) U.S. Cl. ................... 73/323; 73/325; 73/332
(58) Field of Search .............................. 73/323, 325, 328, 73/332, 333, 334

(56) References Cited

U.S. PATENT DOCUMENTS

| | | | |
|---|---|---|---|
| 2,607,225 | * 8/1952 | Biscoe | 73/323 |
| 2,607,226 | * 8/1952 | Biscoe | 73/323 |
| 2,607,227 | * 8/1952 | Biscoe | 73/323 |
| 3,691,835 | * 9/1972 | Metzger | 73/209 |
| 3,886,796 | 6/1975 | Gruett | 73/328 |
| 4,345,468 | 8/1982 | Jackson | 73/326 |
| 4,440,028 | * 4/1984 | Ramlow | 73/861.55 |
| 4,693,117 | 9/1987 | Mills | 73/326 |
| 4,987,777 | 1/1991 | Bourret et al. | 73/328 |
| 5,052,224 | 10/1991 | Ford et al. | 73/325 |
| 5,323,653 | 6/1994 | Gruett | 73/326 |
| 5,323,654 | 6/1994 | Newman | 73/323 |
| 5,383,360 | 1/1995 | Bertani | 73/323 |
| 5,442,959 | 8/1995 | Mills | 73/326 |
| 5,628,231 | 5/1997 | Sheridan | 73/323 |
| 5,648,607 | 7/1997 | Wolf | 73/332 |

* cited by examiner

Primary Examiner—Hezron Williams
Assistant Examiner—Dennis Loo
(74) Attorney, Agent, or Firm—Russell J. Egan

(57) ABSTRACT

A safety liquid level sight gauge with a transparent sight tube coaxially disposed between mounting blocks and concentrically within a transparent shield tube which is protected by a metal sleeve with a sliding inspection window for observing the liquid level therein. The gauge includes a sight tube breakage shut off system, and a leak shut off system. The breakage shut off system includes the transparent sight tube coaxially aligned between a pair of check valves within each mounting block. A check valve push rod is concentrically disposed and supported within the bore of the sight tube and urges both check valves to an open position allowing liquid to enter the bore of the sight tube. When the push rod collapses, such as when the sight tube is either cracked or broken, the check valve move to a closed position. The leak shut off system allows the check valves to move to a closed position when a pressure change occurs in the interstices formed between the transparent sight tube and the shield tube, the interstice is in communication with a diaphragm positioned on one end of a check valve activation plunger. The plunger is positioned between one end of the push rod and one check valve and moves perpendicularly to the push rod with a normal position that allows the push rod movement to be transferred to the check valve and a leak shut off position that allows the check valves to move to a closed position. A pressure change within the interstices influences the diaphragm to move the plunger to the leak shut off position closing the check valves.

19 Claims, 10 Drawing Sheets

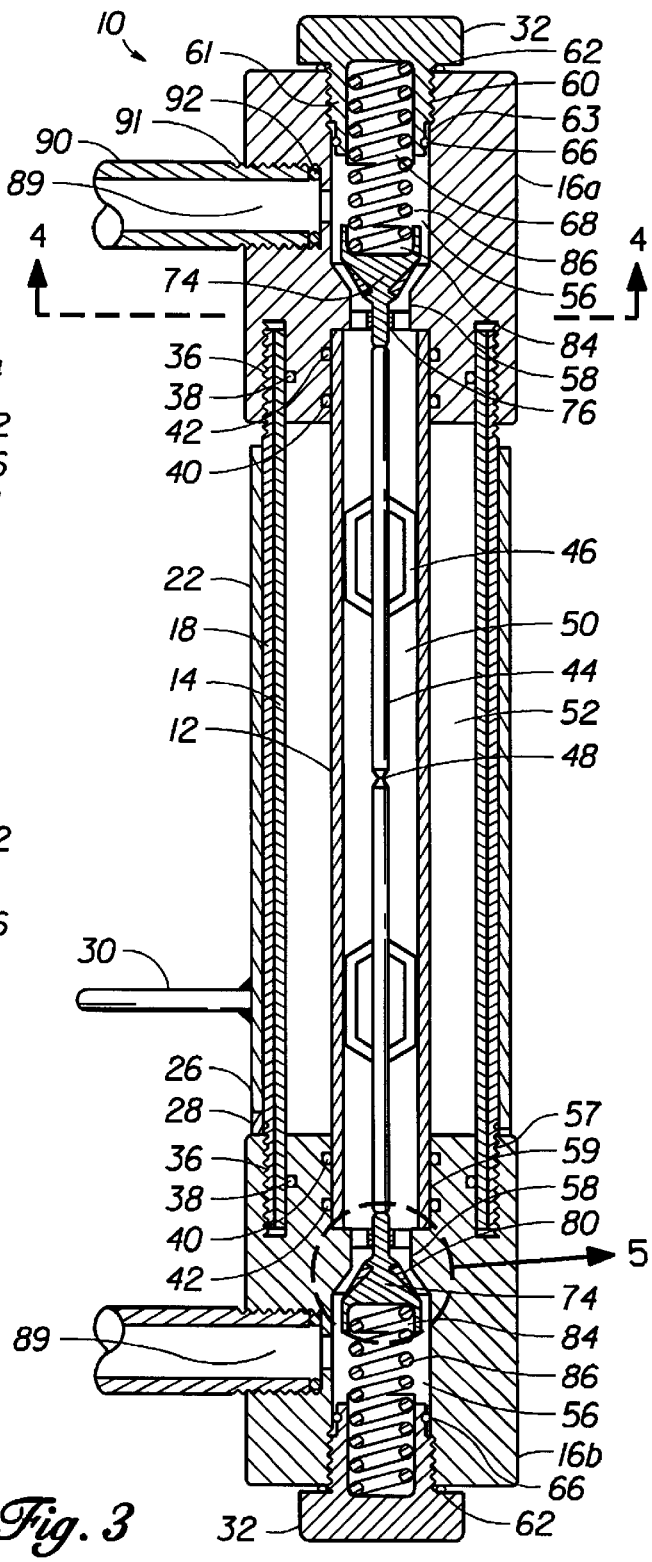
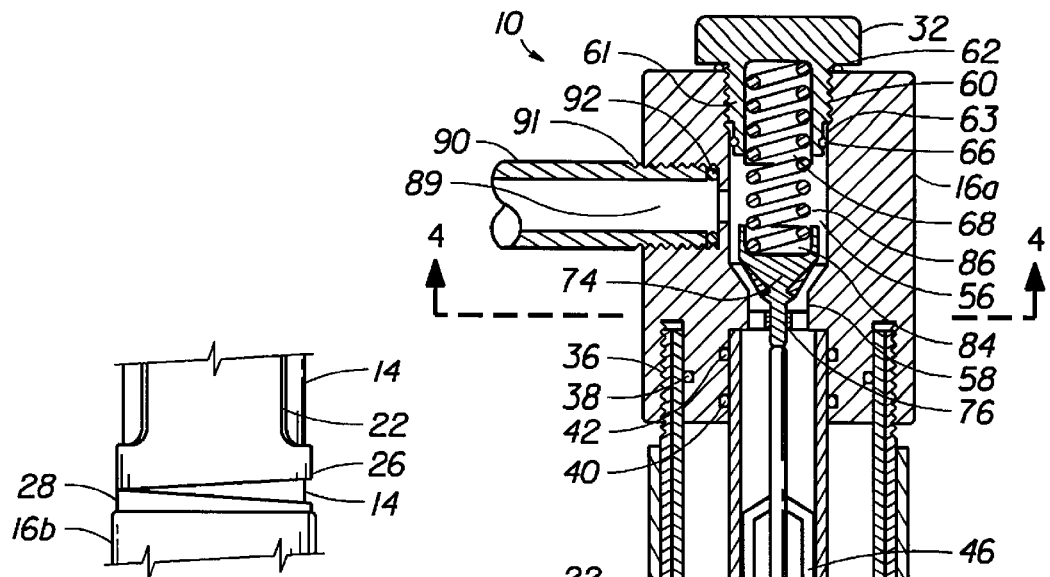
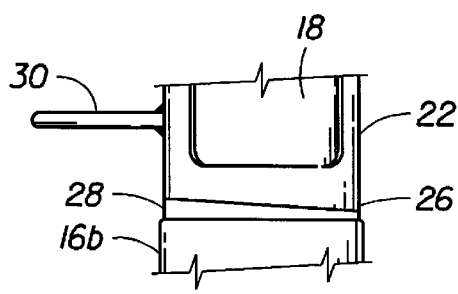
Fig. 2A
Fig. 2B
Fig. 3

SAFETY LIQUID LEVEL SIGHT GAUGE

TECHNICALL FIELD

The present invention relate s to devices and methods for sight gauges and more particularly to a safety sight gauge for visually inspecting liquid level or presence in vessels and sight flow monitoring for piping systems, reactors and the like. The present invention is a transparent sight tube gauge positioned between two coaxially aligned check valves, a two piece check valve push rod is axially disposed and supported in the bore of the sight tube and extends about the length of the sight tube and urges both check valves open. When the sight tube is cracked or broken, the push rod collapses and allows the check valves to close. An outer tubular shield protects the sight tube and forms an interstice between the sight tube and outer tube which is in communication with a diaphragm at one end of an adjustable check valve actuator which moves the check valves to a closed position when a leak occurs within the interstice.

BACKGROUND ART

Liquid sight indicators are used as liquid level gauges for vessel inventory estimation and sight flow monitors for piping system flow indication (bull's eye), or as observation sites for process equipment such as reactors, heaters, storage vessels and the like. Sight gauges are typically externally mounted on a vessel or pipe and connected between two mounting blocks attached within the range of liquid movement to indicate the presence and/or level of liquid therein. Gauges for visual indication employ transparent tubular conduits of an inert substance such as glass mounted between the mounting blocks. Breakage of the glass tube is a concern.

Many inventors have described sight gauges that improve safety by externally shielding the glass sight tube. These inventions are extremely useful for their stated purposes however they do not include a leak shut off system as the present invention which trips coaxially aligned check valves to a closed position when pressure changes, caused by a leak, occur in the gauge. Examples of prior art sight gauges are described in the following patents:

Wolf, U.S. Pat. No. 5,648,607 describes a replaceable sight gauge assembly which includes two bolt assemblies. Each bolt assembly includes an entry bolt and an exit bolt, the entry bolt houses a valve which is opened when the exit bolt is mated therein, the valved bolts provide a means for replacing the sight gauge.

Sheridan U.S. Pat. No. 5,628,231 describes a sight glass for steam boilers which includes and flanges provided with molded inserts which serve to provide sealing means engaging the end surface of a sight glass. A concentrically disposed guard tube is also maintained in sealed relation to the end flanges. Tie rods to prevent excess tightening of the ended flanges are also provided.

Mills, U.S. Pat. No. 5,442,159 describes a sight gauge positioned between two spaced apart compression fittings which receive an elongated tubular transparent tube shield and a slightly longer concentrically placed sight tube.

Newman, U.S. Pat. No. 5,323,654 describes a shielded sight glass positioned between two spaced apart confronting fitting which is shielded by a polygon impact resistant plastic enclosure.

Gruett U.S. Pat. No. 5,323,653 concerns a method for mechanically supporting a shield for a liquid gauge. The apparatus includes a support member, first and second end blocks which are slidable engagable with the support member while each has a passage way, sealborne by each of the end blocks and disposed in each of the passage ways and a transparent tube telescopingly received in the respective passage ways and defining a fluid passage way or chamber.

Bertani, U.S. Pat. No. 5,383,360 describes a column type level indicator with a means for its outward mounting through fixing screws with axial and transvese holes therethrough which act as ducts into the sight tube.

Ford et al. U.S. Pat. No. 5,052,224 describes a shielded vertically mounted sight gauge with a transparent pipe extending between housings, while each housing includes a flange for receiving a larger transparent shielding pipe, one flange telescopingly receives the shield with a biasing means that urges against the shield pipe so that the flange can be moved away from the shield pipe and access gained to the sight tube.

Sheridan et al. U.S. Pat. No. 4,838,095 describes a sight glass with sampling system and includes an inner transparent glass tube an outer concentric shield tube forming an interstices between the tubes and a drain for remaining leakage caused by fracture of the inner tube.

Mills U.S. Pat. No. 4,693,117 describes a shielded tubular gauge for placement between two spaced apart fittings connected to a vessel to show the level of liquid in the vessel, including an elongated sheet of protective material slidable received in the U-shaped edges of the frame.

Jackson U.S. Pat. No. 4,345,468 describes a level sight monitor which includes a double tube sight element. The internal glass element is connected to the liquid system being monitored. The external tube is transparent plastic and provides a protective shield to the internal pipe and is spaced apart from the internal tube with "O" rings fitted, preferably flanged inserts. The annulus between the two tubes can be environmentally purged.

Gruett, U.S. Pat. No. 3,886,796 describes a gauge for indicating liquid level in a tank with a transparent plastic tube disposed between a pair of hollow end members.

GENERAL SUMMARY DISCUSSION OF INVENTION

It is an object of the present invention to provide a safety liquid level sight gauge that includes a transparent sight tube coax ally disposed between mounting blocks and concentrically within a transparent shielding tube which protects the sight tube from breakage and collects leaking contents.

It is another object of the present invention to provide a safety liquid level sight gauge with a sight tube breakage shut off system that includes; a pair of check valves positioned on both ends of the gauge within sight gauge mounting blocks, a transparent sight tube is coaxially disposed between the check valves, a two piece check valve push rod is axially disposed end to end and supported within the bore of the sight tube and extends about the length of the sight tube whereby the push rod urges both check valves to an open position allowing liquid to enter the bore of the sight tube and whereby the end to end alignment of the push rods slips when the sight tube is either cracked or broken allowing the check valves to move to a closed position.

It is another object of the present invention to provide a safety liquid level sight gauge with a leak shut off system which allows the check valves, described above, to move to a closed position when a leak occurs from the transparent sight tube or its connection with the mounting blocks, the leak shut off system includes; an interstices formed between an outer surface of a transparent sight tube and an inner surface of a concentrically placed transparent shield tube, the interstice is in communication with a diaphragm positioned at one end of an adjustable check valve activation plunger, the plunger is keyed and has a longitudinal axis perpendicularly aligned with a longitudinal axis of the check valve push rods and positioned between one end of one push rod and one check valve. The activation plunger has two positions; a normal position which allows longitudinal push rod movement to be transferred to the check valve through a moveable transfer pin, and a leak shut off position which allows the check valves to move to a closed position by aligning an aperture through the plunger with the push rod and the check valve. A spring urges the plunger to remain in the normal position by overcoming the pressure, a pressure change within the interstices cause the diaphragm to move the plunger by overcoming the biasing force of the spring and urging the plunger to move to the leak shut off position allowing the push rod and check valve to r tract into the plunger aperture thereby closing the check valves. The plunger spring force is adjustable allowing a user to adjust the leak shut off system to trip at a desired pressure change.

It is another object of the present invention to provide a safety liquid level sight gauge that includes a transparent sight tube co centrically disposed within a transparent shield tube and wherein the shield tube is further protected by a metal sleeve with a sliding inspection window for observing the liquid level therein.

Accordingly, a safety liquid level sight gauge is provided that includes a transparent sight tube coaxially disposed between mounting blocks and concentrically within a transparent shield tube which protects the sight tube from breakage and collects leaking contents, the transparent shield tube is protected by a metal sleeve with sliding inspection windows for observing the liquid level therein. The sight gauge also includes a sight tube breakage shut off system, and a leak shut off system. The breakage shut off system includes a pair of check valves positioned within each mounting block with the transparent sight tube coaxially disposed between the check valves. Liquid passageways extend through the mounting blocks and open check valves into the transparent sight tube, two check valve push rods are concentrically disposed end to end and supported within the bore of the sight tube and extend about the length of the sight tube so that the push rods urge both check valves to an open position allowing liquid to enter the bore of the sight tube. When the end to end alignment of the push rods is deviated, such as when the sight tube is either cracked or broken, the push rods collapse allowing the check valves to move to a closed position. The push rods are constructed with lateral centering fins extending to an interior surface of the sight tube facilitating longitudinal concentric movement of the push rods within the bore of the sight tube, the push rod may include more than two separate pieces each with its own lateral centering fins or legs and beveled ends so that all push rod pieces may be easily aligned and centered within the bore of the sight tube. The leak shut off system allows the check valves to move to a closed position when a pressure change occurs in the interstices formed between an outer surface of the transparent sight tube and an inner surface of a concentrically placed transparent shield tube, the interstice is in communication with a diaphragm positioned on one end of an adjustable check valve activation plunger while a pressure change causes diaphragm and plunger movement. The plunger is keyed for vertical alignment and has a longitudinal axis perpendicularly aligned with a longitudinal axis of the check valve push rod and is positioned between an end of one push rod and one check valve. The activation plunger has two positions; a normal position which allows longitudinal push rod movement to be transferred to the check valve through a moveable transfer pin disposed within the plunger, and a leak shut off position which allows the check valves to move to a closed position by aligning the check valve and push rod with an aperture through the plunger. A spring urges the plunger to remain in the normal position, a pressure change within he interstices influences the diaphragm to overcome the biasing force of the spring and urge the plunger to move to the leak shut off position thereby closing the check valves. The plunger spring force is adjustable allowing a user to adjust the leak shut off system to trip at a desired pressure change.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2a is an isolated side view of a lower section of the metal sleeve taken along line 2—2 of FIG. 1a illustrating the metal sleeve rotational ramp with the metal sleeve inspection window in an open position.

FIG. 2b is an isolated side view of a lower section of the metal sleeve taken along line 2—2 of FIG. 1a illustrating the metal sleeve rotational ramp with the metal sleeve rotated 90° from the FIG. 2a illustration, to a closed position.

FIG. 3 is a longitudinal cross section of the sight gauge taken along line 3—3 of FIG. 1a.

FIG. 7c is an isolated perspective view of the diaphragm chamber and activation plunger for the alternative embodiment of FIG. 7a.

EXEMPLARY MODE FOR CARRYING OUT THE INVENTION

It can be seen from the following description that the safety liquid level sight gauge 10 includes numerous novel elements that create a particularly safe sight gauge that is usable in many applications where safety is a high concern. The sight gauge provides breakage protection for the transparent sight tube, an automatic shut off system in the event of sight tube breakage, and a leak shut off system.

Figure 1A:
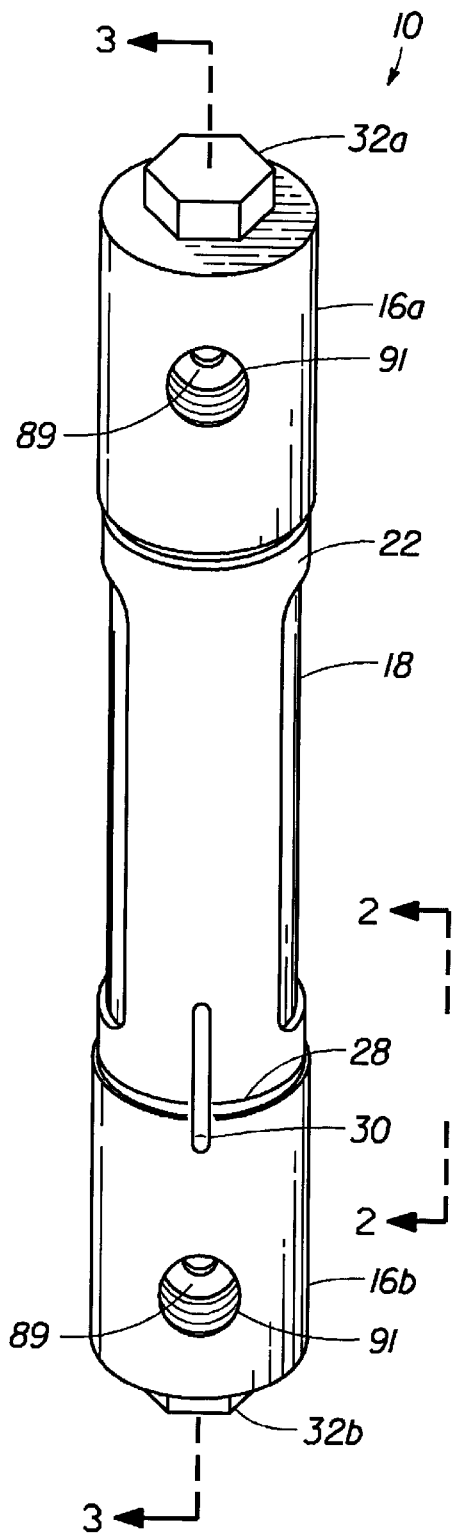
FIG. 1a is a perspective view of the safety liquid level sight gauge with the metal outer sleeve rotated over the inspection window.
Figure 1B:
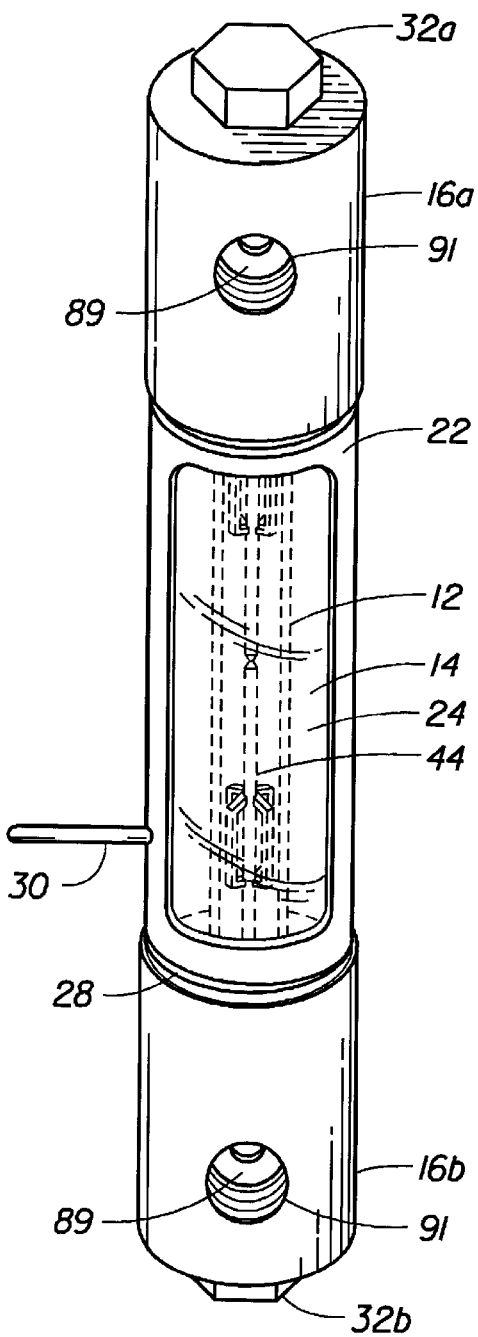
FIG. 1b is a perspective view of the safety liquid level sight gauge of FIG. 1a with the outer metal sleeve rotated 90° so that the inspection windows are visible.
Figure 4:
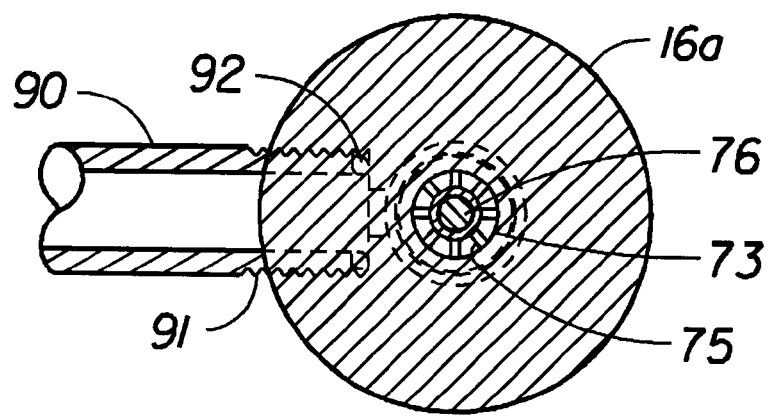
FIG. 4 is a cross section view taken along line 4—4 of FIG. 3 illustrating liquid passageways through the check valve and mounting block.
Figure 8:
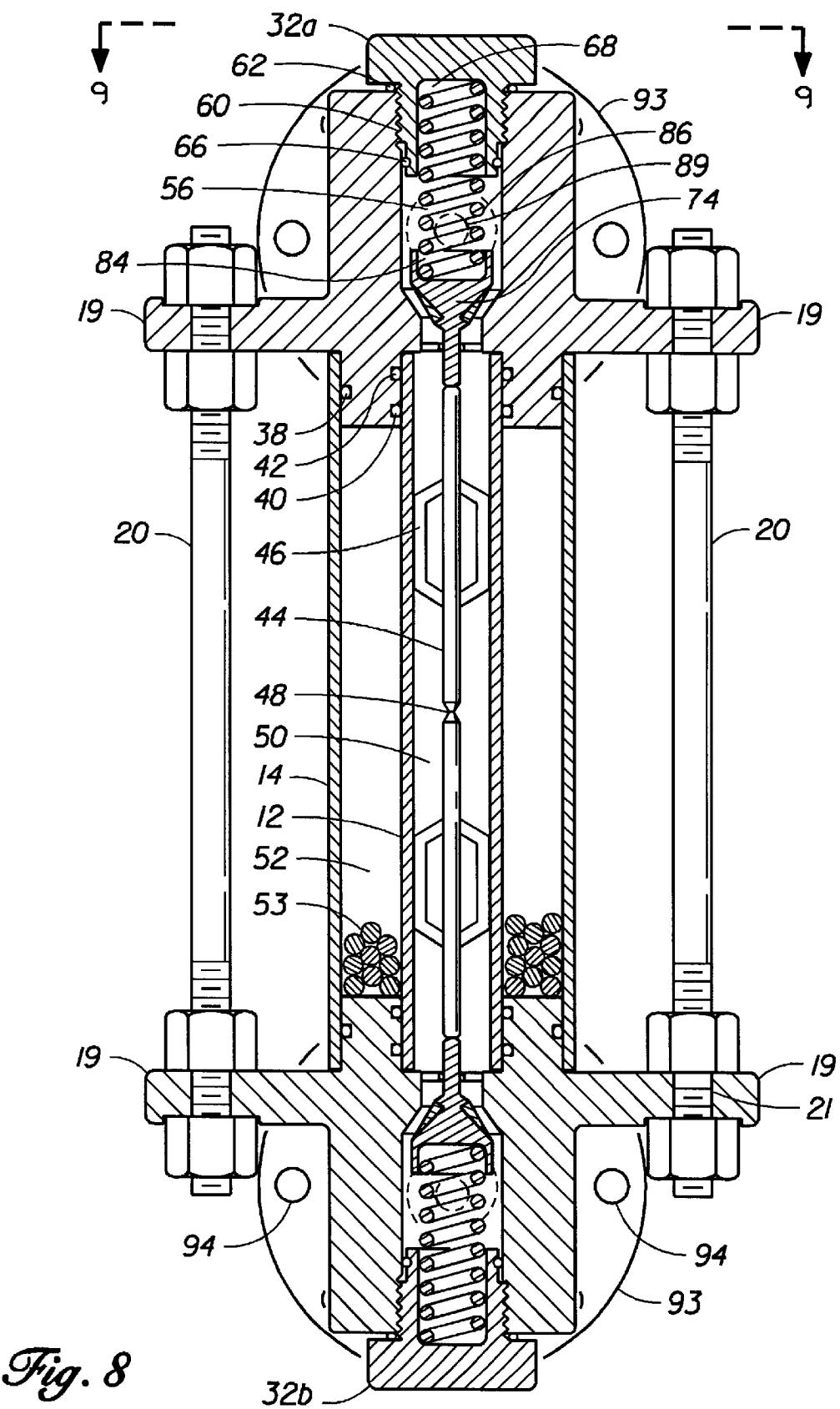
FIG. 8 is an alternative embodiment of the safety liquid level sight gauge which includes flanged mounting blocks with several elongated bolts for assembling the gauge and liquid presence material contained within the interstice between the transparent sight tube and the shielding tube.
Figure 9:
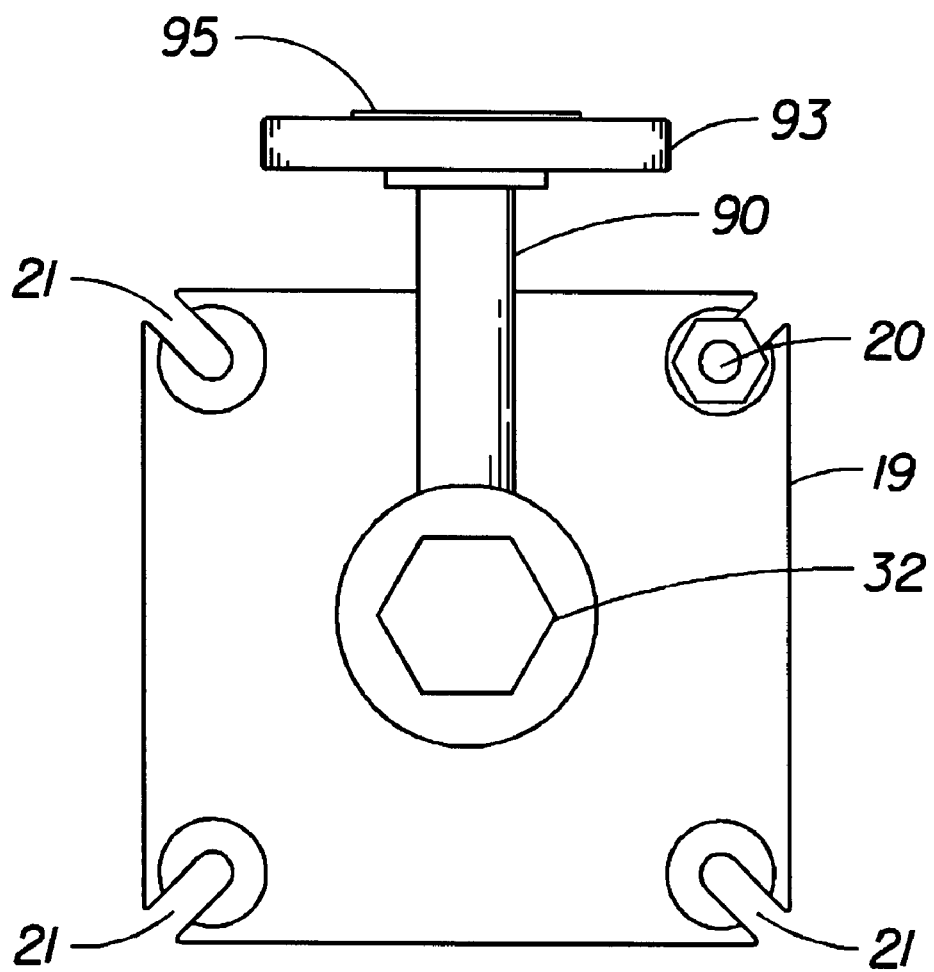
FIG. 9 is an end view taken along line 9—9 of FIG. 8 illustrating the bolt pattern on the flanged mounting blocks.

Referring to the figures in detail, FIGS. 1a–b illustrate a simplified embodiment of the sight gauge 10 which generally includes upper and lower mounting blocks 16a–b, transparent sight tube 12, transparent shield tube 14, push rod 44, outer metal sleeve 22, and inspection windows 24. Alternative embodiments of the sight gauge 10 are illustrated in FIGS. 7a–f and in FIGS. 8 and 9. The embodiment illustrated in FIGS. 7a–f set forth the leak shut off system which includes a diaphragm chamber 110 and related components which will be more fully described hereinafter, the leak shut off system may be included on any of the embodiments. FIGS. 8 and 9 disclose an alternative embodiment of the invention which includes flanged mounting blocks for securing the mounting blocks with assembly bolts 20, for protection the sight tube 12 while an inlet nipple 90 is built into the mounting block for easy mounting of the sight gauge to existing plumbing and/or a vessel.

FIG. 1a illustrates the sight gauge 10 with the outer metal sleeve 22 rotated to a position closing the inspection windows 24 while FIG. 1b is the same view of the sight gauge 10 with the metal sleeve 22 rotated 90° clockwise to open the inspection windows. FIG. 3 is a cross section taken along line 3—3 if FIG. 1a and illustrates the internal components of the sight gauge 10. The sight gauge is mounted vertically, for orientation purposes mounting block 16a is the upper mounting block and 16b is the lower mounting block. Although the mounting blocks 16a–b are illustrated in the figures as a round component, they may be constructed of any geometry suitable for specific applications. The mounting block is preferably constructed of a noncorrosive inert material such as stainless steel, or any other metal alloys suitable for chemical exposure without experiencing corrosion and/or degradation. The mounting blocks 16 include a check valve disposed internally. A check valve bore 56 extends vertically through each mounting block with one end threaded while the other end of the check valve bore has a diameter which is narrowed to form a check valve seat 81.

Figure 5:
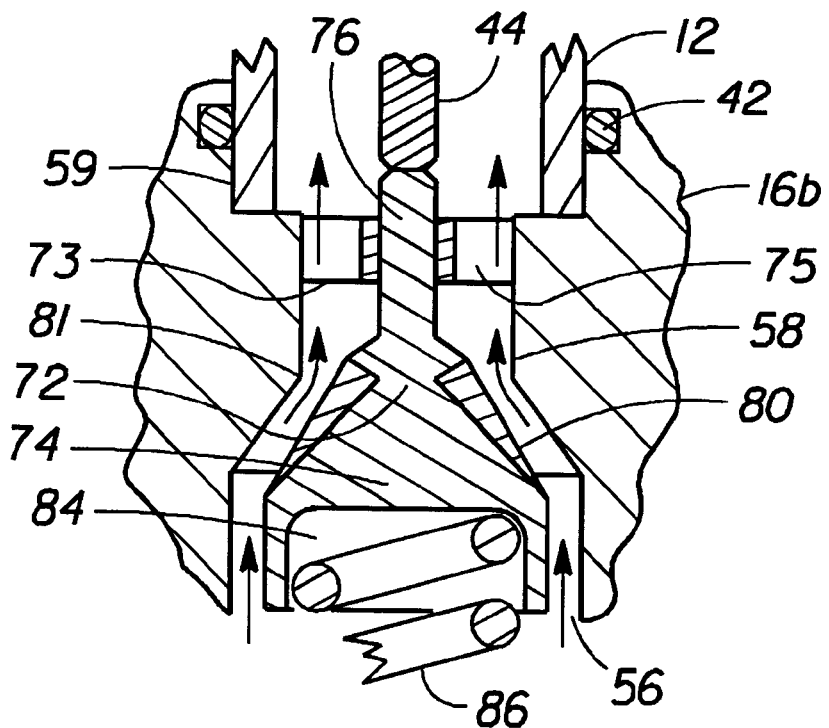
FIG. 5 is an enlarged isolated cross section view taken from area 5 of FIG. 3 illustrating the details of a check valve, valve seat, and liquid passage ways.

FIG. 5 illustrates the details of the mounting block with inserted check valve piston 74. The check valve bore 56 is dimensioned so that the check valve piston 74 freely moves vertically therein. The mounting block further includes a sight tube receiving aperture 59 which is concentrically aligned with check valve bore 56. A larger diameter shield tube receiving concentric ring groove 57 is positioned on the same side of the mounting block 16 and around the sight tube receiving aperture 59. The threaded end 60 of the check valve bore 56 receives the check valve plug 32. The check valve plug 32 provides access to the mounting block and check valve components. The check valve plug 32 includes a hex head with a threaded shank 61 and a check valve plug spring receiving bore 68 extending into the shank end. A sealing O-ring 66 forms a se al between a non threaded portion of the shank 63 and the check valve bore 56 and O-ring sea 62 forms a seal between the hex head and the mounting block. The check valve piston 74 has a general conical shape with a spring side toward the plug 32 and sealing side toward the valve seat 81. A check valve shoulder portion 72 serves to seal against the check valve seat 81. Th check valve piston 74 also includes a reduced diameter portion 78 that extends from the shoulder portion 72 and forms a push rod mating surface 76 which extends from the check valve bore 56 and serves as a contact area for the push rod 44. Opposite the push rod mating surface 76, the check valve includes a spring receiving bore 84. A check valve spring 86 is disposed between the check valve piston 74 and the check valve plug 32 and is securely held in place by th check valve piston spring receiving bore 84 and the check valve plug spring receiving bore 68.

The check valve is assembled by first placing the check valve piston 74 within the bore 56, inserting the spring either concurrently with the check valve piston 74 or separately, and then following the spring 86 with the check valve plug 32 making sure the check valve spring 86 is received within the check valve plug spring receiving bore 68 and then threadingly sealing and securing the check valve plug 32, and check valve spring 86 in position. The check valve spring 86 causes the check valve piston 74 to remain in a normally closed position.

Figure 6A:
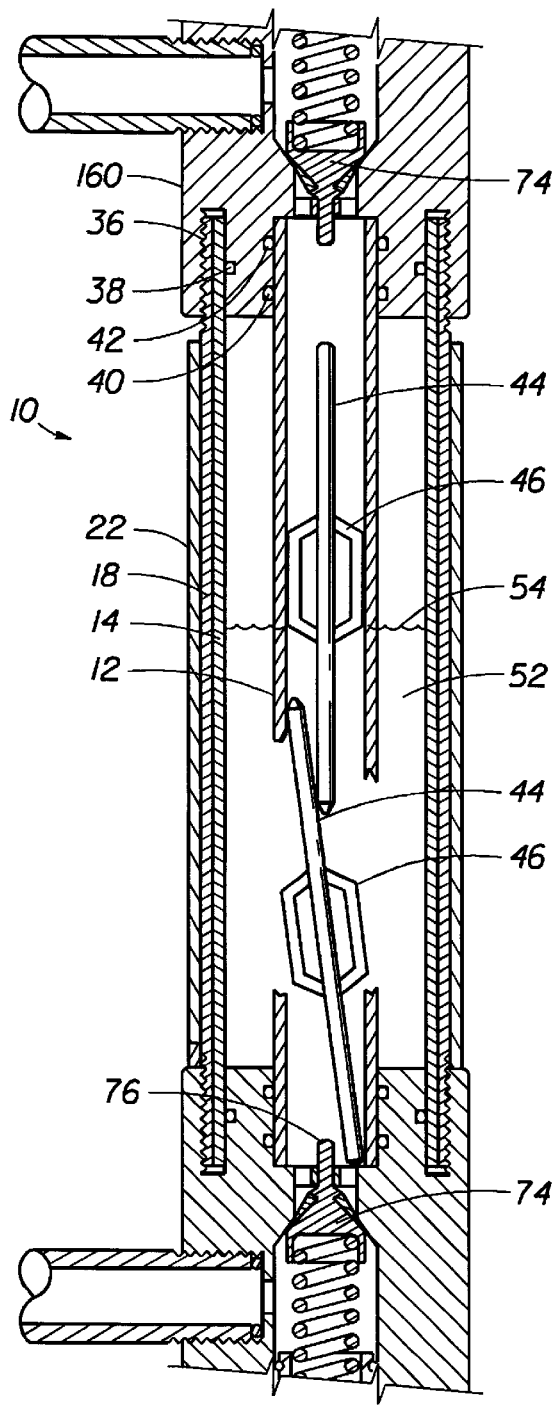
FIG. 6a is a longitudinal c ross section side view taken along line 3—3 of FIG. 1a illustrating the check valves in a closed position after the transparent sight tube and push rod have been broken.
Figure 6B:
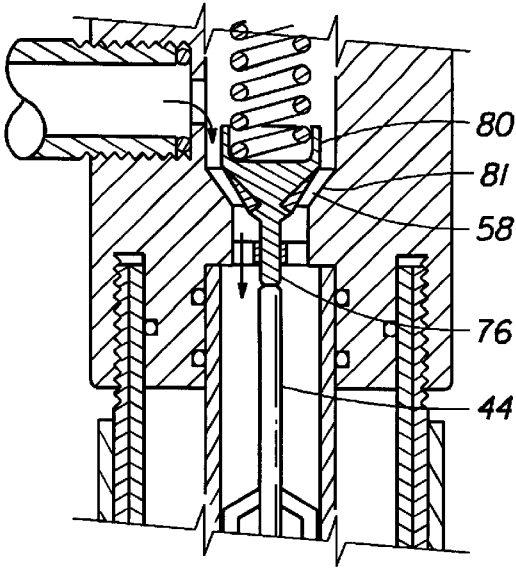
FIG. 6b is an isolated cross section side view of one end on the safety liquid level sight gauge illustrating the push rod urging the check valve to a normal open position.
Figure 6C:
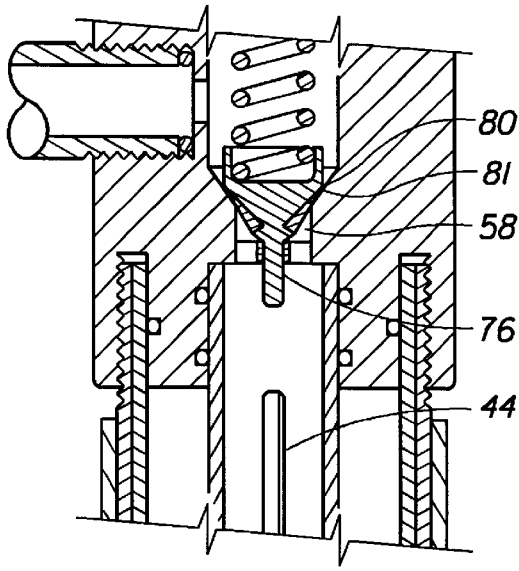
FIG. 6c is an isolated cross section side view of one end on the safety liquid level sight gauge illustrating the push rod in a shortened, or broken, position allowing the check valve to move to a closed position.

Transparent sight tube 12 is Constructed of inert transparent material such as tempered glass and includes an interior bore 50 longitudinally extending the length of the tube. Two sealing O-rings 40 and 42 are positioned at each end of the tube to form a seal between an outside surface of the transparent sight tube d the sight tube receiving bore 59 in the mounting blocks 16. A check valve push rod 44 is installed internally within the interior bore 50 of the transparent side tube 12 and between each check valve piston 74. The purpose of the push rod 44 is to force both check valve pistons 74 to an open position by overcoming the biasing forces of both check valve springs 86. The length of the push rod 44 is such that its placement between the check valve pistons 74 causes the pistons to remain in an open position and not seated. Accordingly, the check valve pistons 74 will move to a close position only when push rod 44 is shortened, either by breakage or removal. Push rod 44 is preferably constructed of breakable, inert material and is centered within the interior bore 50 of transparent sight tube 12 by centering legs 46 which extend to an interior surface of the bore of the transparent sight tube. The centering legs 46 are dimensioned to allow the push rod to easily slide longitudinally within the sight tube bore 50. There are a plurality of centering leg and preferably at least three centering legs positioned in two locations on the push rod to help maintain its center position in relation to a longitudinal axis of the sight tube interior bore, the check valve piston and check valve piston bore. The push rod 44 includes a reduced diameter shear point 48 which easily snaps upon application of lateral forces. FIG. 6a illustrates a break age event wherein the transparent sight tube 12 has been broken resulting in the push rod 44 snapping at the shear point 48 thereby allowing the check valve pistons 74 to move to a close position.

Fluid passageways are provided to allow fluid to easily enter and exit the sight gauge including an inlet 89 into each mounting block which extends to the check valve bore 56 while fluid passageways around the check valve piston 58 extend from the check valve bore 56 into the interior bore 50 of the transparent sight tube 12. When the check valve piston 74 is in a closed position, the fluid passageway 58 is blocked. When the check valve pistons 74 are in an open position the fluid passageway 58 is in communication with the interior bore of transparent sight tube 12 allowing the interior bore 50 of the sight tube 12 to be filled with liquid from the vessel, tank, or plumbing, desire to be monitored.

Shield tube 14 is constructed of transparent break resistant material such as lexan, polycarbonate, ABS plastics, or any other materials suitable for such a purpose. The shield tube 14 may also be constructed of an inert transparent material such as tempered glass. The shield tube is concentrically placed about the sight tube 12 and inserted into the shield tube receiving concentric ring groove 57 positioned on each mounting block 16. A seal is formed between an interior surface of the shield tube and he mounting block by use of O-ring 38 positioned on each mounting block. The shield tube extends longitudinally about the same length as the transparent sight tube 12. For the embodiment illustrated in FIGS. 1–7, an inner metal sleeve 18 concentrically receives the shield tube 14 and functions to protect the shield tube from breakage and also serves to secure each mounting block, the sight tube, and shield tube in proper orientation. The inner metal sleeve 18 includes a threaded portion at each end 36 which is threadingly received by each mounting block by threads disposed within the concentric ring groove 57. The shield tube 14 and t e transparent sight tube 12 are arranged concentrically to form an interstice 52 to collect leaked contents from a leaking, cracked or broken sight tube 12. FIG. 6a illustrates the collection of liquid contents within the interstices defined by the interior of the shield tube 14. The outer metal sleeve 18 includes inspection windows 24 which are two opposing cut outs allowing visual inspection of the transparent sight tube 12. There are preferably two inspection windows 24 orientated oppositely through the inner metal sleeve so that a line of sight through one inspection window extends through the other inspection window positioned on opposite side of the inner metal sleeve. An outer rotatable metal sleeve 22 is concentrically placed around the inner metal sleeve 18 and includes inspection windows which are aligned and dimensioned similar to the inspection windows on the inner metal sleeve 18. The outer metal sleeve is rotatable from a inspection window closed position as illustrated in FIG. 1a so that the shielding tube is fully encircled with metal sleeve material to an open position. The outer metal sleeve 18 rotates by use of handle 30 approximately 90° to align the inspection windows for visual inspection of the interior components of the sight gauge. The outer metal sleeve 22 is preferably slightly shorter in length than the distance between the mounting blocks when the mounting blocks are securely attached by the threaded portions of the inner metal sleeve. A lower end of the outer metal sleeve is angle cut 26 while a ramp support 28 is provided at the lower mounting block 16b, the ramp support 28 and the angle cut portion of the outer metal sleeve are aligned so that the outer metal sleeve angle portion travels up the ramped support 28 to a highest position when the inspection windows 24 are aligned for visual inspection of the interior components of the sight gauge. The outer metal sleeve is rotated back to a close position by releasing handle 30 and allowing gravity to influence the outer metal sleeve to rotate back down the ramped support.

Figure 7A:
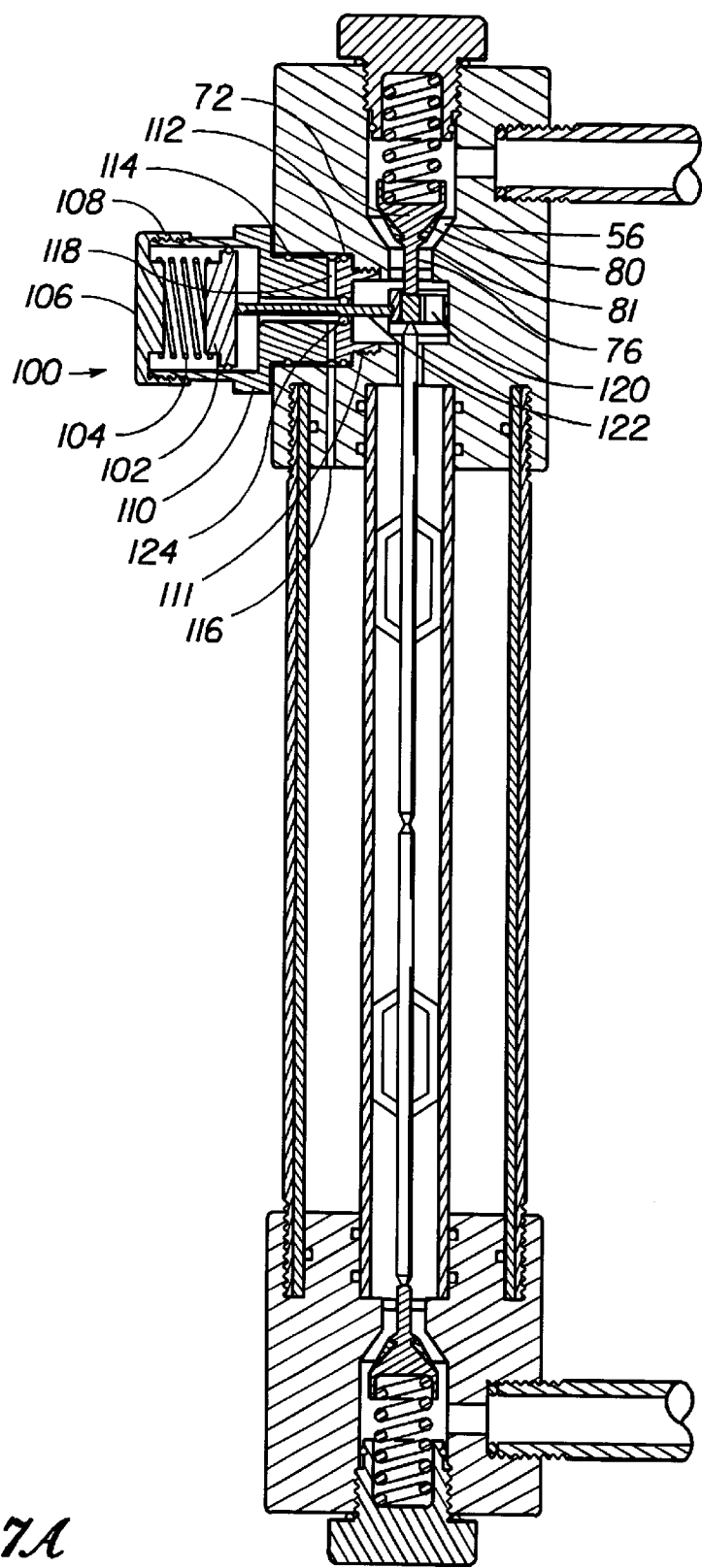
FIG. 7a is a longitudinal cross section side view of an alternative embodiment of the safety liquid level sight gauge which is fitted with a leak shut off system.
Figure 7B:
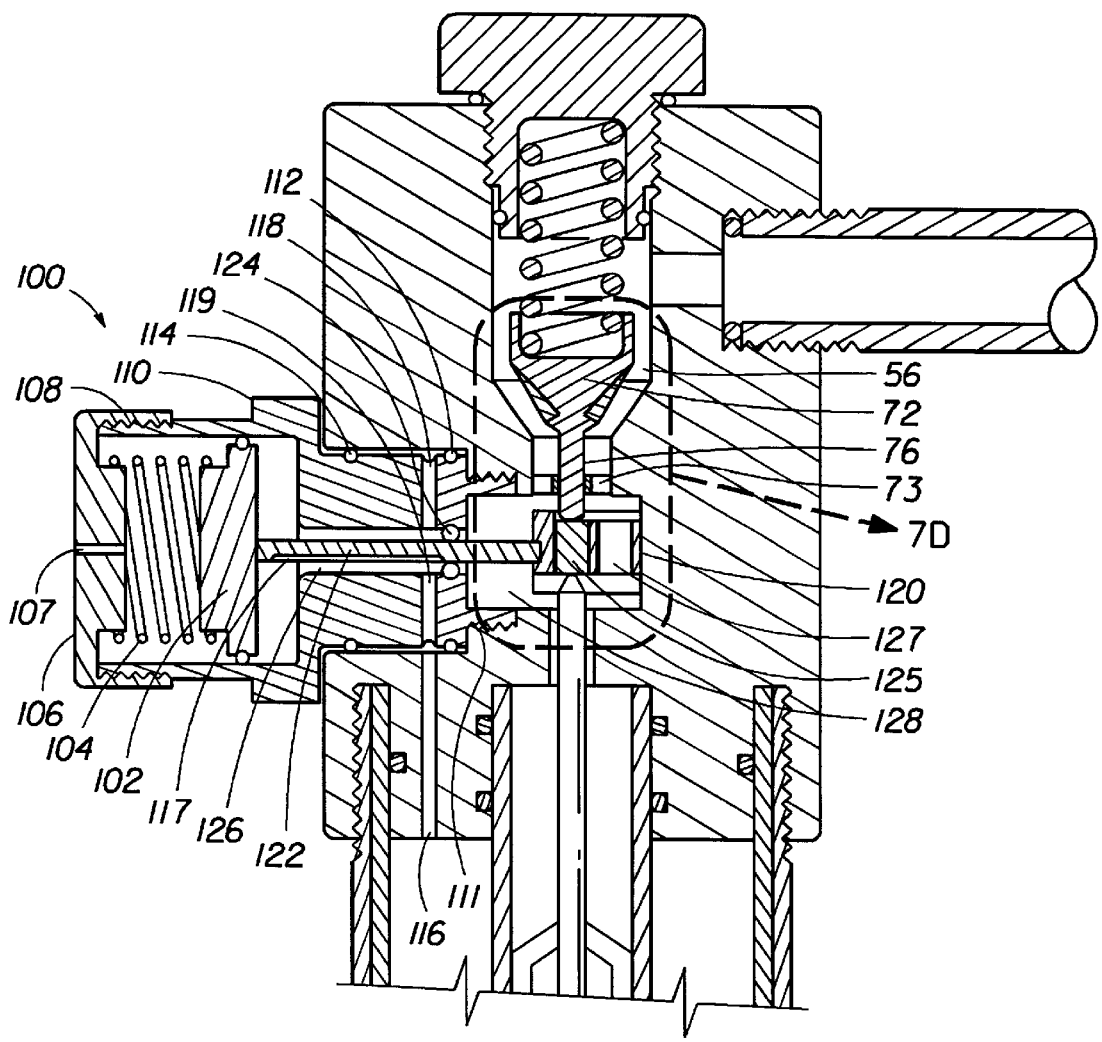
FIG. 7b is an isolated cross section side view of the alternative embodiment of FIG. 7a illustrating the diaphragm and activation plunger fitted on one end of the gauge.
Figure 7C:
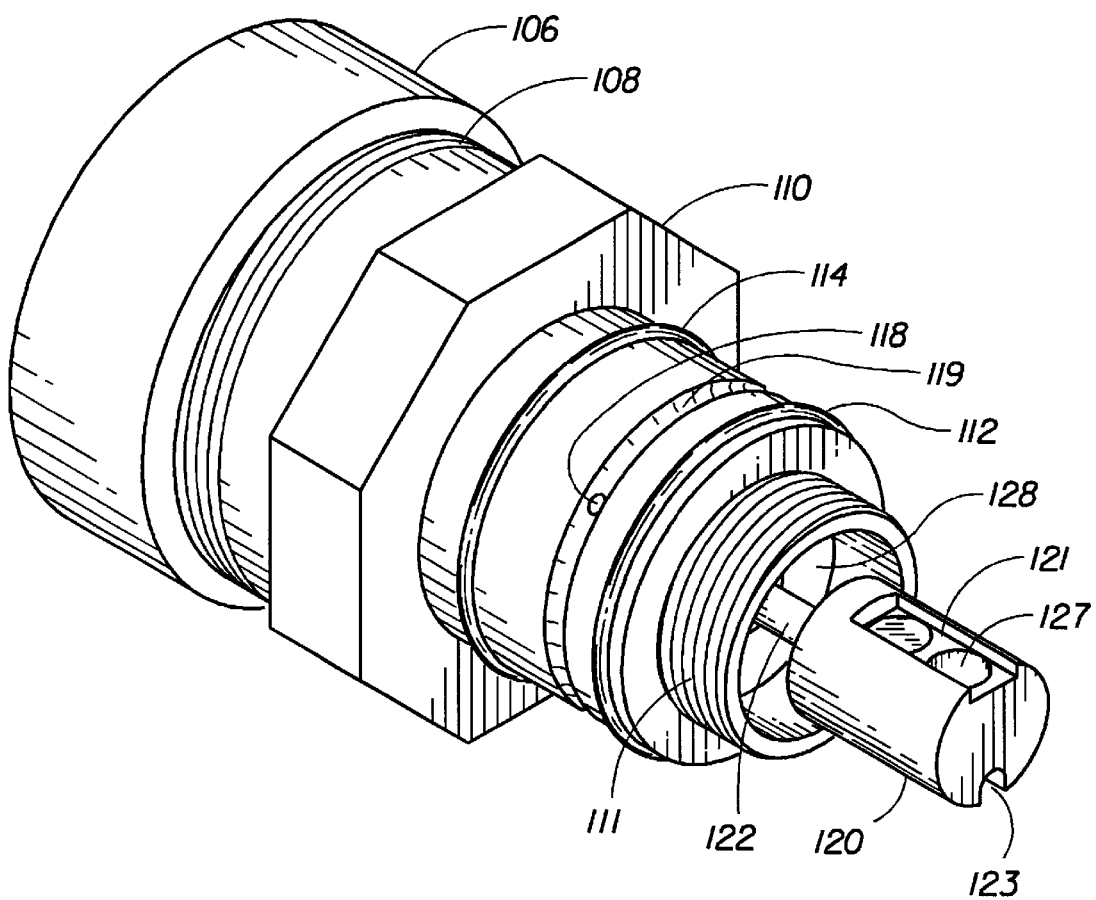
Figure 7D:
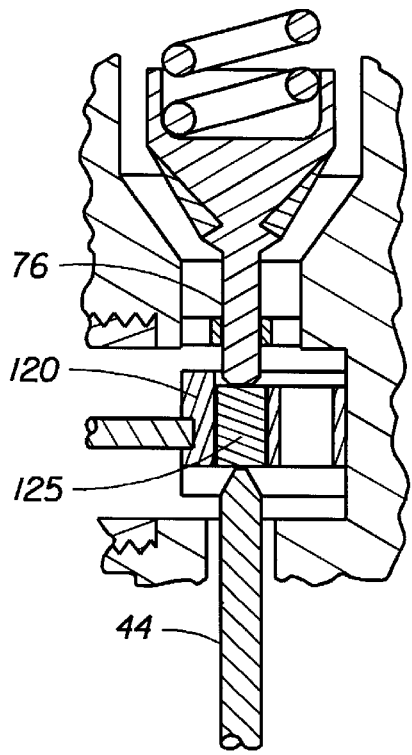
FIG. 7d is an isolated enlarged cross section taken from area 7 of FIG. 7b illustrating the activation plunger of the leak shut off system in a normal open position.
Figure 7E:
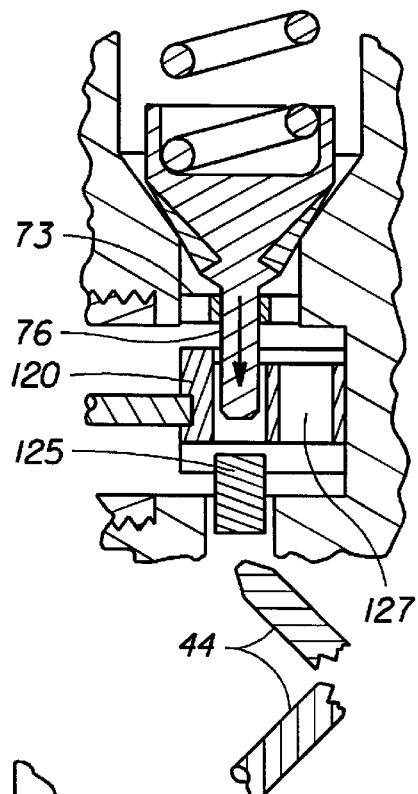
FIG. 7e is an isolated enlarged cross section taken from area 7 of FIG. 7b illustrating the activation plunger of the leak slut off system in a normal open position but allowing the check valve to move to a closed position upon breakage of the push rod.
Figure 7F:
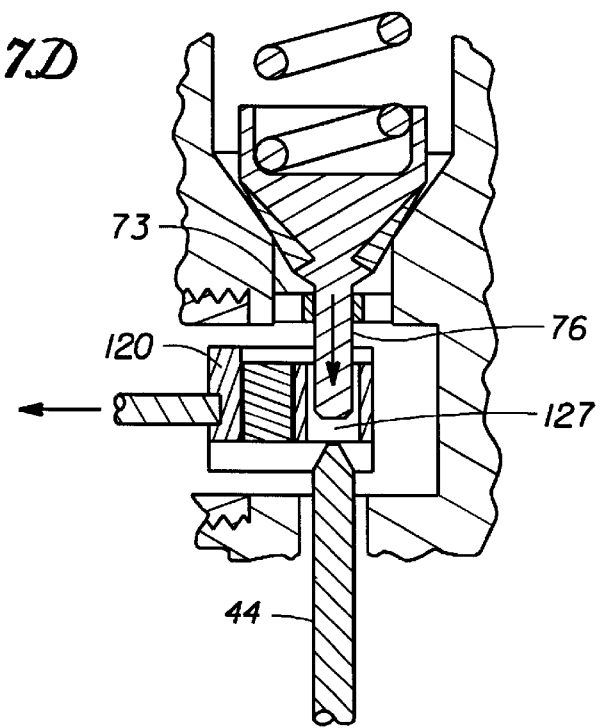
FIG. 7f is an isolated enlarged cross section taken from area 7 of FIG. 7b illustrating the activation plunger of the leak shut off system in a leak shut off position allowing the check valve to move to a closed position.

The leak shut-off system for the sight gauge 10 is illustrated in detail in FIGS. 7a–f. The leak shut-off system includes a diaphragm chamber 100 with a diaphragm chamber body 110 mounted to a side portion of the upper mounting block 16a. A diaphragm 102 is mounted internally within the diaphragm chamber, a diaphragm spring 104 is disposed between the diaphragm 102 and a diaphragm chamber cap 106 which is threadingly received on the diaphragm chamber body 110. The diaphragm spring 104 tension is adjustable by incrementaly screwing the chamber cap 106 in or out. A diaphragm plunger bore 126 extends through the diaphragm chamber body 110 in a direction perpendicular to a longitudinal axis of the push rod 44 and a longitudinal axis of the check valve piston 74. A leak shut-off plunger 120 is disposed at an end of the plunger rod 122 opposite the diaphragm 102. Diaphragm movement within the diaphragm chamber 100 causes th leak shut-off plunger to move via the plunger rod 122. The leak shut off plunger is positioned between the push rod 44 and the push rod mating end 73 of the check valve piston 74. The check valve piston 74 for the embodiment of the invention which includes a leak shut-off system includes an extended push rod mating portion 73 while the mounting block 16a is slightly elongated to accommodate the leak shut-off mechanism described herein. The check valve bore 56 of the embodiment for the leak shut-off system terminates at a bored area for receiving the leak shut-off plunger while the push rod 44 extends through a short bore through the mounting block into the leak shut-off plunger bore. Fluid passageways from the check valve extend through the leak shut-off plunger bore and around the push rod extending through its bore. The leak shut-off lunger 120 is notched or keyed to be aligned vertically for two different activation positions. A normal position aligns a transfer pin 125 on the plunger with the check valve and the push rod 44 This alignment allows the push rod 44 to push the transfer pin 125 into contact with the push rod mating end 73 so that the check valves will close when the push rod is shortened by breakage or otherwise. The leak shut off activation plunger 120 is moved to a second leak shut off portion when pressure within the interstices 52 travels through pressures passageway 116 and 117 into contact with diaphragm thereby urging the diaphragm and leak shut off plunger 120 to move in a direction away from the longitudinal axis of the push rod 44 and aligning the push rod 44 an the push rod mating end 73 with an aperture 127 extending through the leak shut off plunger. The movement and operation of the leak shut off plunger and its positioning in relation to the transfer pin 125 and the aperture 127 are illustrated in FIGS. 7d–f. When the diaphragm and activation plunger 120 have moved to a leak shut-off position, push rod mating end 73 is allowed to enter an aperture 127 while push rod 44 also enters the aperture 127 allowing the opposing check valve to close concurrently. The diaphragm chamber and diaphragm diameter may be increased to accomodate narrower pressure changes to activate the leak shut off system, while a smaller diameter diaphragm and chamber may be utilized for operating the leak shut off system over broader pressure changes.

An alternative embodiment of the invention is disclosed in FIGS. 8 and 9 and includes flanged portions 19 of mounting blocks 16 wherein the flanged portions of the mounting blocks provide assembly bolt holes for securing the mounting block together which securing the shield tube 14 and transparent sight tube 12 in place. When this embodiment is utilized, the transparent shield tube 14 does not include inner metal sleeve 18 as described above. Furthermore, floatable leak indicators 53 may be placed in the interstices 52 for visually indicating the presence of leaked fluids. In addition to the flanged portions of the mounting blocks, FIGS. 8 and 9 illustrate a flanged inlet port 93. Although FIG. 9 illustrates four flanged portions 19, there may be as few as three flanges while not deviating from the intent of the invention. Slotted bolt holes 21 receive elongated assembly bolts 20 on each flanged portion 19 so that the sight gauge is easily assembled. The assembly bolts 20 not only serve to hold the sight and shield tube in place but also to provide protection for the shield tube. A flanged attachment nipple 90 is also illustrated in FIG. 8 and 9 and includes a flanged portion 93 with mounting bolt holes 94 and seal 95 so that the sight gauge may be easily attached to existing plumbing if desired. A flanged attachment nipple 90 is attached to each mounting block and may be included on any of the embodiments described herein.

It is noted that the embodiment of the safety liquid level sight gauge described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood the details herein are to be interpreted as illustrative and not in a limiting sense.

What is claimed is:

1. A safety liquid level sight gauge, comprising:
   a) a pair of check valve with check valve pistons disposed within mounting blocks, a transparent sight tube with check end sealingly mounted to each mounting block and with a longitudinal interior bore coaxially aligned with the check valves, liquid passage ways extending through the mounting blocks around the check valves and into the interior bore of the transparent sight tube, a spring disposed within each check valve which urges each check valve piston to a closed position blocking the liquid passage way into the interior bore of the transparent sight tube,
   b) push rod means concentrically disposed within the longitudinal bore of the transparent sight tube and between each check valve piston with a first length which deflects each check valve piston to an open position allowing liquid to flow through the passage ways into the interior bore of the transparent sight tube, the check valves move to a closed position when the push rod is shortened to a second length, and
   c) a shield tube concentrically disposed about the transparent sight tube and sealingly mounted to each mounting block.

2. The safety liquid level sight gauge of claim 1, wherein the mounting blocks further comprise:
   a check valve piston bore extending through each mounting block with a longitudinal axis aligned with the longitudinal axis of the sight tube and with one threaded end for sealingly receiving a threaded check valve plug and another end with a narrowed diameter adjacent to the sight tube forming a check valve seat, the check valve includes a conical check valve piston with a sealing surface circumferentially formed about a shoulder area at one end and a check valve spring receiving bore positioned on an opposite end, the check valve spring is disposed between the check spring receiving bore and the threaded check valve plug urging the check valve sealing surface to contact the valve seat, the check valve piston further includes a push rod mating surface adjacent to the sealing surface and opposite the check valve spring receiving bore.

3. The safety liquid level sight gauge of claim 2 wherein the mounting blocks further comprise:
   extended flanged portions with slotted apertures for receiving assembly bolts that extend between the mounting blocks and secure the mounting blocks to the transparent sight and shield tube, a sight tube receiving bore on each mounting block with seals positioned therein for sealingly receiving the sight tube.

4. The safety liquid level sight gauge of claim 3 wherein the flanged mounting blocks further comprise:
   at least three extended flanged portions on each mounting block each with a slotted bolt aperture alignable with an opposing slotted bolt aperture on an opposing mounting block with assembly bolts extending through each bolt aperture.

5. The safety liquid level sight gauge of claim 1 further comprising: a protective metal sleeve with a rotatable inspection window including an inner metal sleeve with male threaded ends concentrically disposed around an outer surface of the shield tube and each end threadingly received by a female threaded portion of each mounting block, the inner metal sleeve includes inspection windows aligned for visually inspecting the sight tube contained therein, and an outer rotatable metal sleeve concentrical disposed about the inner metal sleeve for free rotational movement with inspection window that are alignable with the inner metal sleeve inspection window upon rotation of the outer metal sleeve while the inner metal sleeve inspection window is closable by further rotation of the outer metal sleeve, the outer metal sleeve also includes an angle cut end which mates with an is supported by a ramped support positioned between the angle cut end of the outer metal sleeve and a mounting block, the ramped support and angled end of the outer metal sleeve are positioned in relation to the inspection windows of both the inner and outer metal sleeves so that when the outer metal sleeve is rotated upon the ramped support to an aligned position the inspection windows are in a closed position, when the outer metal sleeve is rotated so that the angled end of the outer metal sleeve travels up the ramped support to a highest position the inspection windows are aligned, the sight gauge is mounted vertically with the ramped support end down allowing gravity to influence the outer metal sleeve to ramp down the ramped support and close the inspection window, a handle is attached to an outer surface of the outer metal sleeve for manually rotating the outer metal sleeve.

6. The safety liquid level sight gauge of claim 1 further comprising:
   a leak shut off system which closes the check valves when a leak occurs from the transparent sight tube or the seal between a sight tube end and the mounting block, the leak shut off system comprising:
   a diaphragm disposed within a diaphragm chamber and connected to one end of a plunger, the plunger is disposed within a plunger bore extending through a side of one mounting block with a longitudinal axis perpendicular and intersecting a longitudinal axis of the push rod and check valve piston and intersecting between the push rod and the check valve piston, the plunger includes a transfer pin with a longitudinal axis aligned parallel to the longitudinal axis of the push rod and the check valve piston, the plunger also included an aperture with a longitudinal axis aligned parallel to the longitudinal axis of the push rod and the check valve piston, the plunger includes a normal positioned where the transfer pin is concentrically aligned with the push rod and the check valve piston so that push rod shortening movement is transferred through the transfer pin allowing the check valve pistons to move to a closed position, the plunger includes a leak shut off position where the plunger aperture is concentrically aligned with the push rod and the check valve piston allowing the check valve pistons to move to a closed position, a pressure increase within the interstices causes the diaphragm to move the plunger from the normal position to the leak shut off position, the diaphragm includes a spring urging the plunger to move to the normal position.

7. The safety liquid sight gauge of claim 1 wherein the mounting blocks further comprise:
   a flanged attachment nipple attached to each mounting block with liquid passageways extending into the mounting block liquid passageways.

8. The safety liquid level sight gauge of claim 1 wherein the push rod further comprises:
   a plurality of centering legs extending tangently from the push rod and about to an interior surface of the transparent sight tube which centers the push rod within the sight tube and allows the push rod to freely move longitudinally within the bore of the sight tube.

9. The safety liquid level sight gauge of claim 1 wherein the push rod further comprises:
   a reduced diameter shear point positioned about mid way between ends of the push rod and which allows the push rod to break at the shear point by the application of lateral forces.

10. A safety liquid level sight gauge, comprising:
   a) a pair of check valves with check valve pistons disposed within mounting blocks, a transparent sight tube with each end sealingly mounted to each mounting block and with a longitudinal interior bore coaxially aligned with the check valves, liquid passage ways extending through the mounting blocks around the check valves and into the interior bore of the transparent sight tube, a spring disposed within each check valve which urges each check valve piston to a closed position blocking the liquid passage way into the interior bore of the transparent sight tube,
   b) a shield tube concentrically disposed around the sight tube providing protection to the sight tube, an interstice formed between an outer surface of the sight tube and inner surface of the shield tube for collecting liquid which may leak from a broken or leaking sight tube,
   c) the mounting blocks further comprise; extended flanged portions with slotted bolt apertures for receiving assembly bolt:, that extend longitudinally between the mounting blocks and secure the transparent sight tube and shield tube between the mounting blocks, a sight tube receiving bore on each mounting block with seals positioned therein for sealingly receiving the sight tube, a shield tube receiving shoulder area with seals positioned thereon for sealingly receiving the shield tube,
   d) a push rod concentrically disposed within the longitudinal bore of the transparent sight tube and between each check valve piston with a length which deflects each check valve piston to an open position allowing liquid to flow through the passage ways into the interior bore of the transparent sight tube, the check valves move to a closed position when the push rod is shortened,
   e) a flanged attachment nipple attached to each mounting block with liquid passageways extending into the mounting block liquid passageways, and
   f) floatable liquid indicators positioned in the interstice between the sight tube and outer shield tube to visually determine the presence of liquid therein.

11. The safety liquid level sight gauge of claim 10, wherein the mounting blocks further comprise; a check valve piston bore extending through each mounting block with a longitudinal axis aligned with the longitudinal axis of the sight tube and with one threaded end for sealingly receiving a threaded check valve plug and another end with a narrowed diameter adjacent to the sight tube forming a check valve seat, the check valve includes a conical check valve piston with a sealing surface circumferentially formed about a shoulder area at one end and a check valve spring receiving bore positioned on an opposite end, the check valve spring is disposed between the check spring receiving bore and the threaded check valve plug urging the check valve sealing surface to contact the valve seat, the check valve piston further includes a push rod mating surface adjacent to the sealing surface and opposite the check valve spring receiving bore.

12. The safety liquid level sight gauge of claim 10 further comprising: a leak shut off system which closes the check valves when a leak occurs from the transparent sight tube or between a sight tube end and mounting block, the leak shut off system includes; a diaphragm disposed within a diaphragm chamber and connected to one end of a plunger, the plunger is disposed within a plunger bore and tending through a side of one mounting block with a longitudinal axis perpendicular and intersecting a longitudinal axis of the push rod and check valve piston and intersecting between the push rod and the check valve piston, the plunger includes a transfer pin with a longitudinal axis aligned parallel to the longitudinal axis of the push rod and the check valve piston, the plunger also included an aperture with a longitudinal axis aligned parallel to the longitudinal axis of the push rod and the check valve piston, the plunger includes a normal positioned where the transfer pin is concentrically aligned with the push rod and the check valve piston so that push rod shortening movement is transferred through the transfer pin allowing the check valve pistons to move to a closed position, the plunger includes a leak shut off position where the plunger aperture is concentrically aligned with the push rod and the check valve piston allowing the check valve pistons to move to a closed position, a pressure increase within the interstices causes the diaphragm to move the plunger from the normal position to the leak shut off position, the diaphragm includes a spring urging the plunger to move to the normal position.

13. The safety liquid level sight gauge of claim 10 wherein the flanged mounting blocks further comprising: at least three extended flanged portions on each mounting block each with a slotted bolt aperture alignable with an opposing slotted bolt aperture on an opposing mounting block with assembly bolts extending through each bolt aperture.

14. The safety liquid level sight gauge of claim 10 wherein the push rod further comprises a plurality of centering legs extending tangently from the push rod and about to an interior surface of the transparent sight tube which centers the push rod within the sight tube and allows the push rod to freely move longitudinally within the bore of the sight tube.

15. The safety liquid level sight gauge of claim 10 wherein the push rod further comprises a reduced diameter shear point positioned about mid way between ends of the push rod and which allows the push rod to break at the hear point by the application of lateral forces.

16. A safety liquid level sight gauge, comprising:
   a) a pair of check v lives with check valve pistons disposed within mounting blocks, a transparent sight tube with each end sealingly mounted to each mounting block and with a longitudinal interior bore coaxially aligned with the check valves, liquid passage ways extending through the mounting blocks around the check valves and into the interior bore of the transparent sight tube, a spring disposed within each check valve which urges each check valve piston to a closed position blocking the liquid passage way into the interior bore of the transparent sight tube, the mounting blocks further comprise; a check valve piston bore extending through each mounting block with a longitudinal axis aligned with the longitudinal axis of the sight tube and with one threaded end for sealingly receiving a threaded check valve plug and another end with a narrowed diameter adjacent to the sight tube forming a check valve seat, the check valve includes a conical check valve piston with a sealing surface circumferentially formed about a shoulder area at one end and a check valve spring receiving bore positioned on an opposite end, the check valve spring is disposed between the check spring receiving bore and the threaded check valve plug urging the check valve sealing surface to contact the valve seat, the check valve piston further includes a push rod meeting surface adjacent to the sealing surface and opposite the check valve spring receiving bore.
   b) a push rod concentrically disposed within the longitudinal bore of the transparent sight tube and between each check valve piston with a length which deflects each check valve piston to an open position allowing liquid to flow through the passage ways into the interior bore of the transparent sigh tube, the check valves move to a closed position when the push rod is shortened, the push rod further comprises a plurality of centering legs extending tangently from the push rod and about to an interior surface of the transparent sight tube which centers the push rod within the sight tube and allows the push rod to freely move longitudinally within the bore of the sight tube an a reduced diameter shear point positioned about mid way between ends of the push rod which allows the push rod to break at the shear point by the application of lateral forces.
   c) a shield tube con centrically disposed about the transparent sight tube and sealingly mounted to each mounting block with a protective metal sleeve with a rotatable inspection window including an inner metal sleeve with male threaded ends concentrically disposed around an outer surface of he shield tube and each end threadingly received by a female threaded portion of each mounting block, the inner metal sleeve includes inspection windows aligned for visually inspecting the sight tube contained therein, and an outer rotatable metal sleeve concentrically disposed about the inner metal sleeve for free rotational movement with inspection windows that are alignable with the inner metal sleeve inspection window upon rotation of the outer metal sleeve while the inner metal sleeve inspection window is closable by further rotation of the outer metal sleeve, the outer metal sleeve also includes an angle cut end which mates with and is supported by a ramped support positioned between the angle cut end of the outer metal sleeve and a mounting block, the ramped support and angled end of the outer metal sleeve are positioned in relation to the inspection windows of both the inner and outer metal sleeves so that when the outer metal sleeve is rotated upon the ramped support to an aligned position the inspection windows are in a closed position, when the outer metal sleeve is rotated so that the angled end of the outer metal sleeve travels up the ramped support to a highest position the inspection windows are aligned, the sight gauge is mounted vertically with the ramped support end down allowing gravity to influence the outer metal sleeve to ramp down the ramped support and close the inspection window, a handle is attached to an outer surface of the outer metal sleeve for manually rotating the outer metal sleeve,
   d) a leak shut off system which closes the check valves when a leak occurs from the transparent sight tube or the sea between a sight tube end and the mounting block, the leak shut off system includes; a diaphragm disposed within a diaphragm chamber and connected to one end of a plunger, the plunger is disposed within a plunger bore extending through a side of one mounting block with a longitudinal axis perpendicular and intersecting a longitudinal axis of the push rod and check valve piston and intersecting between the push rod and the check valve piston, the plunger includes a transfer pin with a longitudinal axis aligned parallel to the longitudinal axis of the push rod an the check valve piston, the plunger also included an aperture with a longitudinal axis aligned parallel to the longitudinal axis of the push rod and the check valve piston, the plunger includes a normal positioned where the transfer pin is concentrically aligned with the push rod and the check valve piston so that push rod shortening movement is transferred through the transfer pin allowing the check valve pistons to move to a closed position, the plunger includes a leak shut off position where the plunger aperture is concentrically aligned with the push rod and the check valve piston allowing the check valve pistons to move to a closed position, a pressure increase within the interstices causes the diaphragm to move the plunger from the normal position to the leak shut off position, the diaphragm includes a spring urging the plunger to move to the normal position.

17. The safety liquid level sight gauge of claim 1 wherein the push rod means further comprises:
   at least two push rods which are axially disposed end-to-end and supported in the sight tube to exceed the length thereof whereby the push rod means urges both check valves to their open positions.

18. The safety liquid level sight gauge of claim 17 wherein each push rod means further comprises:
   a plurality of laterally extending centering fins whereby each said push rod is restrained to longitudinal concentric movement within the sight tube.

19. The safety liquid level sight gauge of claim 17 wherein each said push rod further comprises:
   beveled end portions whereby axial alignment of said push rods is facilitated.

* * * * *